2 Sheets--Sheet 1.

A. CANFIELD.
Corn-Cultivators.

No. 155,419.

Patented Sept. 29, 1874.

WITNESSES
E. H. Bates
George E. Uphall.

INVENTOR
A. Canfield.
Chipman, Hosmer & Co.,
ATTORNEYS.

By

2 Sheets--Sheet 2.
A. CANFIELD.
Corn-Cultivators.
No. 155,419. Patented Sept. 29, 1874.
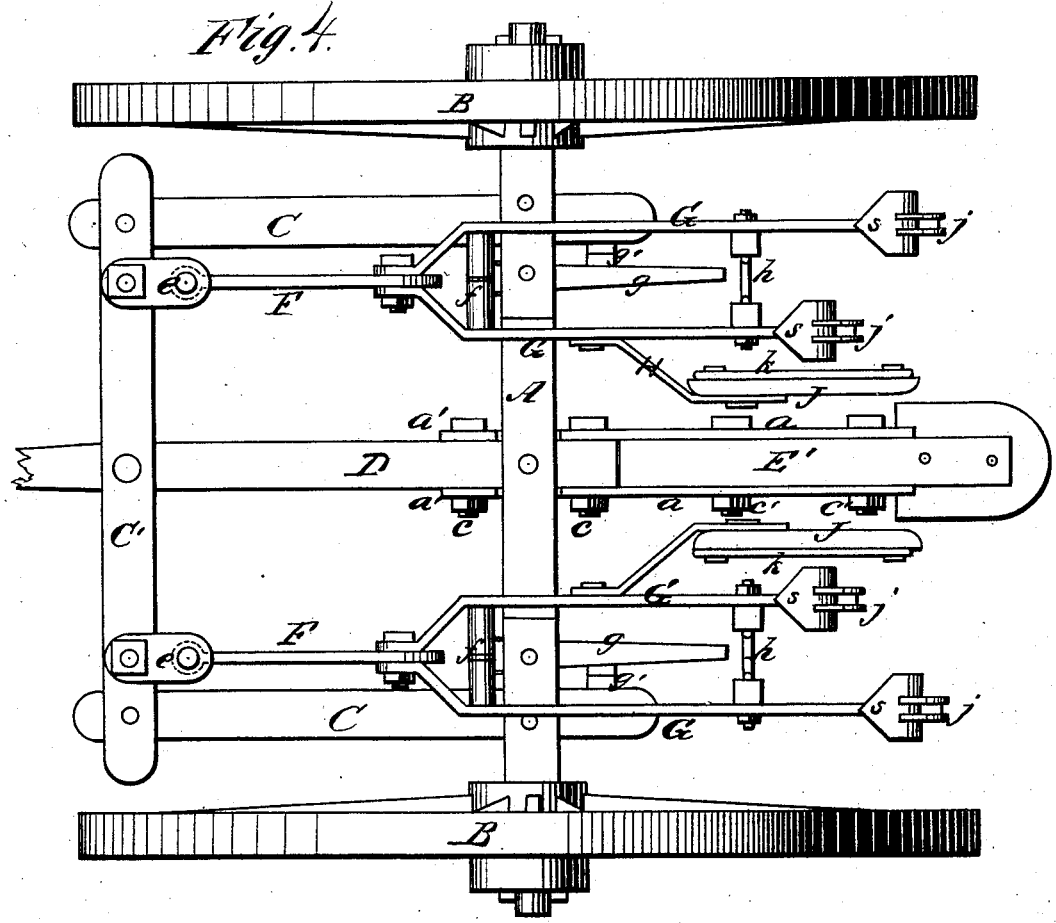
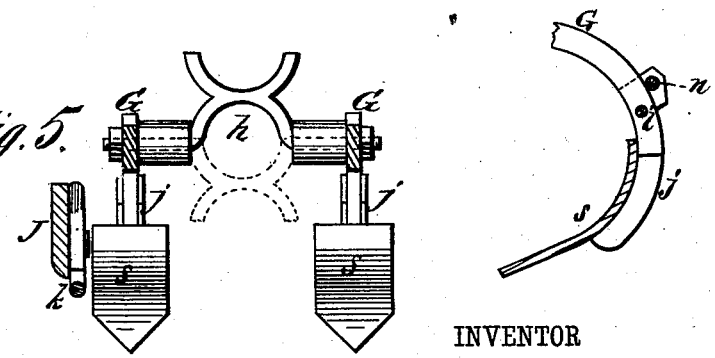
WITNESSES
E. H. Bates
George E. Upham
INVENTOR
A. Canfield,
Chipman, Hosmer & Co.
Attorneys

UNITED STATES PATENT OFFICE.

ANDREW CANFIELD, OF GARNETT, KANSAS.

IMPROVEMENT IN CORN-CULTIVATORS.

Specification forming part of Letters Patent No. 155,419, dated September 29, 1874; application filed June 20, 1874.

*To all whom it may concern:*

Be it known that I, ANDREW CANFIELD, of Garnett, in the county of Anderson and State of Kansas, have invented a new and valuable Improvement in Corn-Cultivators; and I do hereby declare that the following is a full, clear, and exact description of the construction and operation of the same, reference being had to the annexed drawings, making a part of this specification, and to the letters and figures of reference marked thereon.

Figure 1:
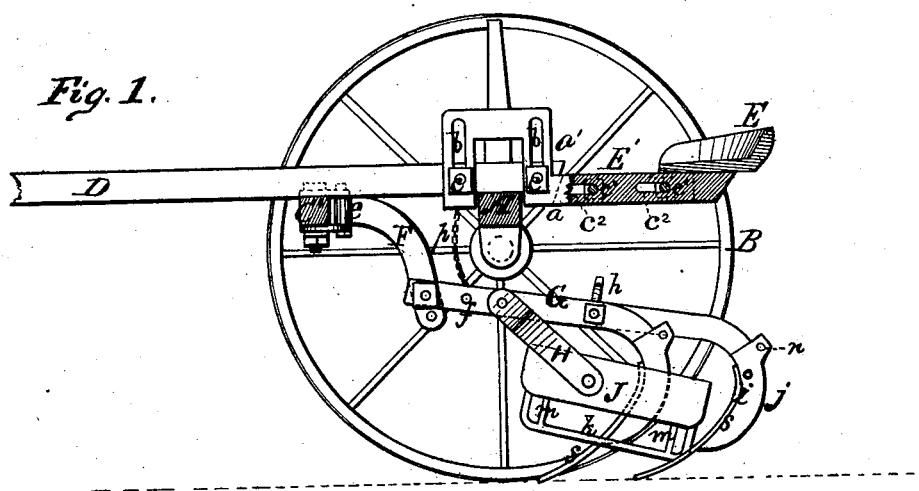
Figure 2:
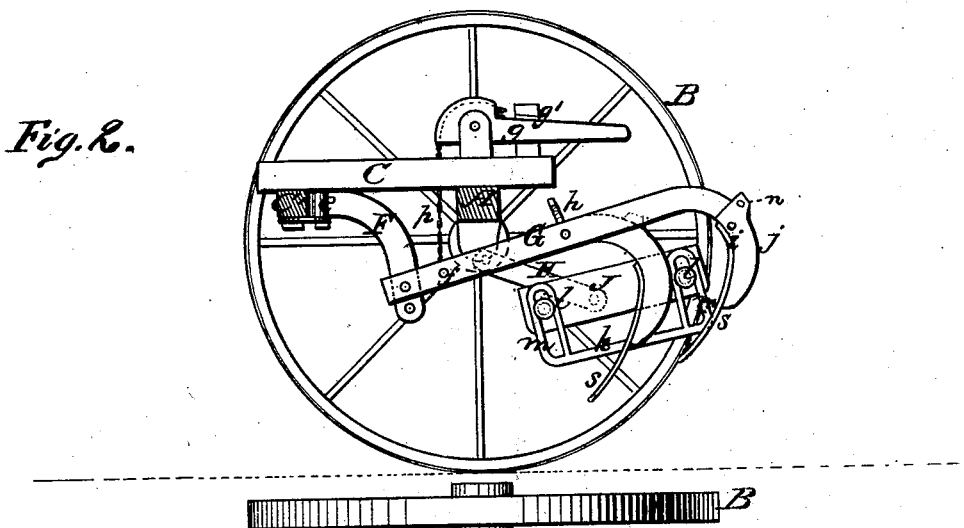
Figure 3:
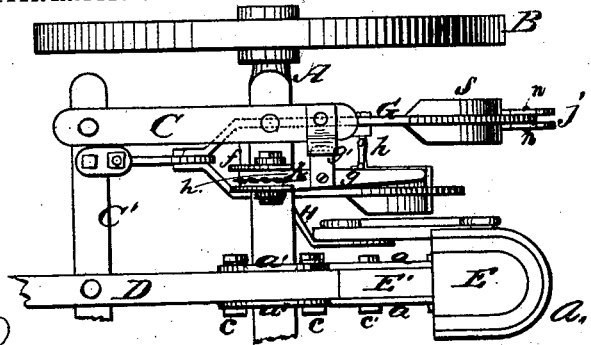

Figure 1 of the drawings is a representation of a sectional view of my corn-cultivator. Fig. 2 is a side view of the same. Fig. 3 is a plan view of the same. Fig. 4 is a plan view, and Fig. 5 is a detail view.

This invention has relation to machines which are designed for cultivating corn, wherein curved beams are employed, carrying the shovels, which beams are adjustable both vertically and laterally, and the driver's seat is located in rear of the axle of two transporting-wheels. My improvements on this class of cultivators relate, especially, to means for raising and lowering the driver's seat, and adjusting the same up to, and from, the axle of the two transporting-wheels, whereby the weight on the horses' necks can be regulated at will, according to the weight of the driver. It also has relation to stirrup-braces, which can be adjusted for a high or a low seat, said braces serving to receive the feet of the operator, all as will be hereinafter explained.

In the annexed drawings, A designates the axle of two transporting-wheels, B, and C C designate two bars, which are secured rigidly, at their rear ends, upon the axle A, and are extended forward thereof, and again secured upon a cross-bar, C'. D designates a draft-pole, which is firmly secured upon the axle A and cross-bar C' at the middle of their length. To the rear end of the draft-pole D the bar E' of a driver's seat, E, is attached by means of two irons, $a\ a$, the front portions of which irons are arched over the axle, as indicated at $a'\ a'$, and vertically slotted, as indicated at $b\ b$. Bolts $c\ c$ are passed through the slots $b$, and through the draft-pole D, and provided with nuts on their ends, by loosening which the seat E can be raised or depressed for a purpose hereinafter explained. The rear straight portions of the irons $a\ a$ are applied to the sides of the seat-bar E', and are secured thereto by means of bolts $c'\ c'$, which are passed through longitudinally-oblong slots $c^2$, so that, by loosening the nuts on bolts $c^1$, the seat and its bar E' can be adjusted backward or forward, according to the weight of the driver. By this latter adjustment the horses can be relieved from the weight of the draft-pole by the weight of the driver in rear of the axle. F F designate two curved draft-bars, which are hinged at $e\ e$, so that their rear ends can be vibrated laterally. To the rear ends of these bars F curved shovel-beams G are pivoted, so that they can be vibrated vertically, the bars F allowing them to be vibrated laterally. The beams are connected together in pairs, and provided with cross-stays $f$, by which they are suspended from hand-levers $g$ on the axle A. In rear of the stays $f$ are stirrup-braces $h$, adapted to receive the feet of the driver when he is in his seat E. Each stirrup-brace is secured to its beams by means of nuts, by loosening which the stirrups can be turned up, as shown in Figs. 1 and 2, or turned down, as shown in Fig. 4. The shovels $s$ are rigidly secured to curved shanks $j\ j$, which are connected, by pivots $i\ i$, to the beams F, and in rear of these pivots wooden pins $n\ n$ are inserted through the upper ends of the shanks $j\ j$, so as to bear against the rear edges of the shovel-beams, and resist all ordinary strain on the shovels when the machine is moved forward; but, in the event of an undue strain occurring, the pins $n$ will break, and allow the shovels to give back. In backing the machine, the shovels will give forward without breaking anything. On the inner side of each pair of shovel-beams a curved arm, H, is rigidly secured, to the rear end of which a guard, J, is attached, and to each guard a runner, $k$, is applied by means of set-screws $l\ l$, which are passed through oblong loops $m\ m$, formed on the upper front and rear ends of the runners. By loosening the screws $l\ l$ the runners can be adjusted so as to raise or depress the guard, and thus adapt it to plants of different sizes. The front ends of the levers $g$, to which the chains are attached, have flanged segments